US005531586A

United States Patent [19]

Hyde

[11] Patent Number: 5,531,586

[45] Date of Patent: Jul. 2, 1996

[54] INTERLOCKING CHECKER BRICK MOLD

[75] Inventor: Jack Hyde, Pittsburgh, Pa.

[73] Assignee: North American Refractories Company, Cleveland, Ohio

[21] Appl. No.: 435,857

[22] Filed: May 5, 1995

Related U.S. Application Data

[62] Division of Ser. No. 222,694, Apr. 4, 1994, Pat. No. 5,474, 726, which is a division of Ser. No. 48,981, Apr. 16, 1993, Pat. No. 5,358,031, which is a continuation-in-part of Ser. No. 899,873, Jun. 12, 1992, Pat. No. 5,299,629.

[51] Int. Cl.[6] .......................... B29C 43/02; B30B 11/02; B28B 3/08

[52] U.S. Cl. .......................................... 425/352; 425/412

[58] Field of Search .................................. 425/344, 352, 425/354, 355, 412, 415

[56] References Cited

U.S. PATENT DOCUMENTS

| | | | |
|---|---|---|---|
| 490,726 | 1/1893 | Stevenson . | |
| 951,579 | 3/1910 | Rigby | 425/355 |
| 1,963,291 | 12/1933 | Brown, Jr. et al. . | |
| 2,017,763 | 10/1935 | Mamula et al. . | |
| 2,107,675 | 2/1938 | McKelvy . | |
| 3,777,805 | 12/1973 | Racasens et al. . | |
| 4,164,537 | 8/1979 | Drostholm et al. | 425/355 |
| 4,298,563 | 11/1981 | DeSantis et al. | 425/352 |
| 4,436,144 | 3/1984 | Horak . | |
| 4,540,039 | 9/1985 | Karl . | |
| 4,651,810 | 3/1987 | Triessnig . | |
| 4,755,332 | 7/1988 | Mizuno et al. | 425/352 |
| 4,940,081 | 4/1990 | Hyde . | |
| 5,075,053 | 12/1991 | Bernadic et al. | 264/109 |

OTHER PUBLICATIONS

Two page excerpt from Harbison–Walker Refractories Company. (more than one year old).

Didier Refractory Products Engineering Services brochure entitled, "Checker Systems Data Conventional Batt (Semi–Closed) Flue Construction," (more than one year old).

Didier Refractory Products Engineering Services brochure entitled, "Checker Systems Data Alternate Conventional Open and Batt Flue Construction" (more than one year old).

Didier Refractory Products Engineering Services brochure entitled, "Checker Systems Data Conventional Flue Construction (Standard Setting)," (more than one year old).

Didier Refractory Products Engineering Services brochure entitled "Checker Systems Data Open Basket Weave Construction," (more than one year old).

"Experimental Studies of the Thermal Performance of Various Cruciform Regenerator Packings" written by Zanoli, Begley and Vidil.

*Primary Examiner*—James P. Mackey
*Attorney, Agent, or Firm*—Watts, Hoffmann, Fisher & Heinke Co.

[57] ABSTRACT

A checker brick mold including a mold body having an internal cavity is disclosed. The cavity has entrance portions with one entrance portion being larger than the other. The cavity also has a central portion between and adjacent the entrance portions and flaring inwardly from the larger entrance portion to the other. A spaced pair of mold entrance sections are provided each to be inserted into an associated one of the entrance portions and having surfaces complemental to the associated entrance portion. A prime mover is operatively connected to the entrance sections for moving the sections toward one another to compress a mass in the cavity and away from one another to remove a compressed mass from the cavity.

4 Claims, 5 Drawing Sheets

INTERLOCKING CHECKER BRICK MOLD

RELATED APPLICATION

This is a divisional of application Ser. No. 08/222,694, filed on Apr. 4, 1994, now U.S. Pat. No. 5,474,726 issued Dec. 12, 1995; which in turn was a divisional of Ser. No. 08/048,981, filed on Apr. 16, 1993, now U.S. Pat. No. 5,358,031; which was a continuation-in-part of Ser. No. 07/899,873, filed Jun. 12, 1992, now U.S. Pat. No. 5,299, 629.

TECHNICAL FIELD

The invention relates to refractory bricks and, more particularly, to interlocking checker bricks used for recovering heat in thermal regenerators or recuperators.

BACKGROUND OF THE INVENTION

Checker bricks are stacked atop one another to create checkerworks that are typically 18 feet high or higher anal are contained in a regenerative or checker chamber. The checkerworks define flues for the alternating downward passage of burning gases within the chamber and upward passage of air within the chamber. The burning gases heat the bricks and the air absorbs heat from the bricks. During such passage, the bricks may tend to move. If the bricks do move relative to each other, the flues within the checkerwork can be partially blocked or even destroyed. It is therefore desirable to have the bricks remain in their original positions.

Prior bricks such as those presently used must be approximately 3 inches thick to stabilize the position of the bricks against displacement. With the prior bricks, approximately ¾–⅞ of an inch of the thickness from each exposed brick surface is involved in heat transfer during the alternating passages of the gases and air. The rest of the brick provides mass to provide stability. It is therefore desirable to reduce the mass of the brick as much as possible while maintaining stability thereby providing more exposed brick surface and flues per chamber.

SUMMARY OF THE INVENTION

Accordingly, it is an object of the present invention to provide checker bricks that maximize exposed surface area, minimize total refractory mass per unit of checker volume, and increase turbulence in gas flow and air flow within checkerworks.

Another object of the present invention is to provide checker bricks having the advantages of the previous paragraph and that are interfitting thereby allowing them to be used to construct stable checkerworks that are 18 feet high or higher and are resistant to displaced alignment.

A checker brick made in accordance with the present invention comprises a rectangular top, a rectangular base, two side walls and two end walls. The end walls have a generally trapezoidal shape and each side wall forms an acute angle with respect to the base. This provides a brick that tapers in thickness from the base to the top and is trapezoidal in cross section.

The brick is further characterized by one of either the top or base including at least two projections and the other of either said top or base including at least two recesses sized to mate with corresponding projections of like bricks. In one version of the brick, there are four projections and four recesses. The recesses and projections mate with projections and recesses of other bricks when bricks are stacked atop one another in an interlocking relationship. Preferably, the projections are frustums.

The tapered shape of the brick allows the bricks to have a thickness, i.e., the width of the brick measured by the width of the base or top, or the lateral dimension of the end walls, to be anywhere from 2–3 inches, or even less, and still be stacked in an interlocking relationship to form a stable checkerwork. The thickness of the bricks is dictated by the material used to make the bricks.

In its preferred form, the end surfaces of each brick are substantially, but not completely, trapezoidal in shape. More particularly, top and bottom sections of the brick sides are respectively perpendicular to the top and bottom surfaces. These top and bottom sections are joined by a central generally planar section that flares outwardly and downwardly so that the overall brick configuration is substantially trapezoidal.

The purpose of the top and bottom sections is to allow latitude in the compression of the brick material as it is shaped prior to firing. In the preferred arrangement, top and bottom rams are provided which are adapted to fit snugly in top and bottom sections of a mold to delineate the top, bottom and side surfaces of a brick. One or both of the rams are driven toward one another until a desired density is achieved. Thus, with this arrangement, bricks of consistent density and slight variation, one brick to another in height, are achieved as contrasted with bricks of consistent heights but varying density where the bricks are truly trapezoidal in cross section.

Uniform density produces a number of advantages which include greater heat storage and conductivity. In addition, it is believed that manufacturing savings will be achieved because, with the constant density, it is anticipated there will be less cracking when the brick is fired. Additionally, there exists a one-to-one relationship between density and creep resistance so uniform, substantially maximized density of the bricks enhances the stability of a checkerwork made from them.

These bricks are used to form checkerworks that comprise tiers or layers of bricks. The bricks are interlocked with bricks of adjacent tiers by mating projections of bricks in one tier with recesses in bricks of a contiguous tier. The bricks of the checkerwork define flues for the passage of gases and air. In one embodiment of a checkerwork made with tiers of bricks having two projections and two recesses, the bricks are each positioned substantially perpendicular to two adjacent bricks within the same tier. Additionally, each brick is transverse to bricks located directly above and directly below it in adjacent tiers. At least a majority of the bricks are each spaced from all other bricks within their respective tiers.

In another embodiment of a checkerwork, tiers comprised of bricks having two projections and two recesses alternate with tiers comprised of rows of bricks having four projections and four recesses. In the tiers comprised of bricks having two projections and two recesses, at least a majority of the bricks are each spaced from all other bricks within the same tier. In the tiers comprised of bricks having four projections and four recesses, the bricks of each tier are aligned in spaced rows.

The advantages of the reduced thickness of the bricks and the checkerworks constructed with the bricks are numerous. The arrangement of the bricks, as well as their shape, in the checkerworks cause increased turbulence in the gas flow as well as the air flow thereby decreasing the laminar flow. This allows for better contact between the gas or air flow and the surfaces of the bricks.

Additionally, the arrangement of the bricks allows for increased brick surface exposure due to the shape and spacing of the bricks. The trapezoidal shape of the bricks allows the base of each brick to contribute to the amount of exposed brick surface that acts as a thermal surface. In the checkerworks wherein the bricks are spaced from all other bricks within their respective tiers, the bricks' end walls contribute to the amount of exposed brick surface that acts as a thermal surface.

Assuming that dimensions of each flue remain the same in checkerworks utilizing the bricks of this invention when compared to dimensions of the flues of prior checkerworks made with prior checker bricks, the refractory mass per unit volume decreases. This reduction in mass per unit volume results in a reduction of brick cost in an almost 1:1 relation. The exposed brick surface area per unit volume increases, thereby improving efficiency. The flow area (flue cross-sectional area per unit of regenerator cross-sectional area) increases. Because of this increase in efficiency, fuel consumption is significantly reduced.

DETAILED DESCRIPTION OF THE PREFERRED EMBODIMENT

Figure 1:
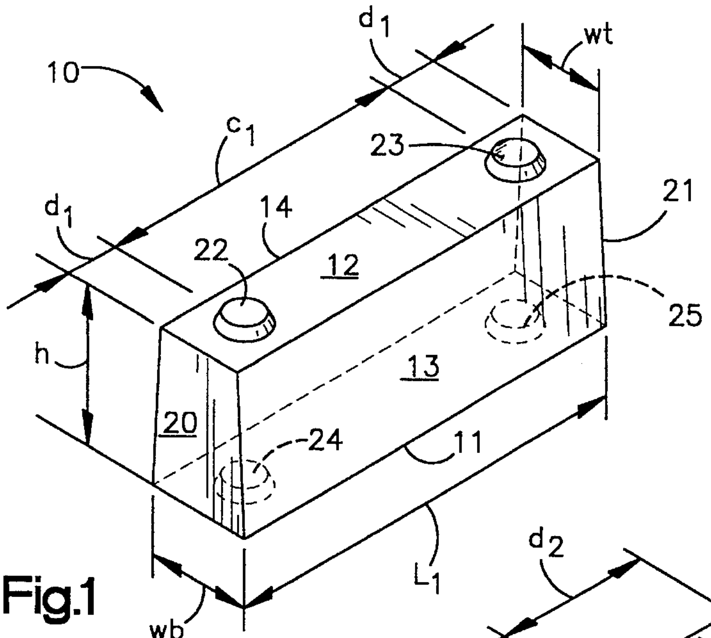
FIG. 1 is a perspective view of a brick according to one embodiment of the present invention.

FIG. 1 illustrates a brick 10 comprised of a refractory material and having a base 11 and a parallel top 12. The brick 10 further includes side walls 13, 14 that slant upwardly and inwardly from the base 11. The side walls 13, 14 parallel a longitudinal axis of the brick 10. The brick 10 also includes end walls 20, 21. The end walls 20, 21 parallel an axis that is transverse to the longitudinal axis of the brick 10.

The brick 10 has a lateral cross section that is trapezoidal in shape. Therefore, each end wall 20, 21 is trapezoidal in shape and each side wall 13, 14 forms an acute angle with respect to the base 11. Accordingly, the brick 10 tapers in width from the base 11 to the top 12.

In one embodiment, the top 12 has two mounting projections 22, 23. The mounting projections are preferably in the shape of frustums. The base 11 includes two recesses 24, 25 that correspond to the size, shape and position of the mounting projections 22, 23.

For illustrative purposes, the brick 10 illustrated in FIG. 1 has an overall length $L_1$ of 12 inches. The width wb of the base is 3 inches while the width wt of the top is 2½ inches. The height h of the brick is 4½ inches. The center to center distance $c_1$ between the mounting projections 22, 23 is 9 inches, while the distance $d_1$ measured from the center of each mounting projection to its corresponding nearest end wall is 1½ inches. It is therefore apparent that the center to center distance $c_1$ is six times the distance $d_1$.

Figure 2:
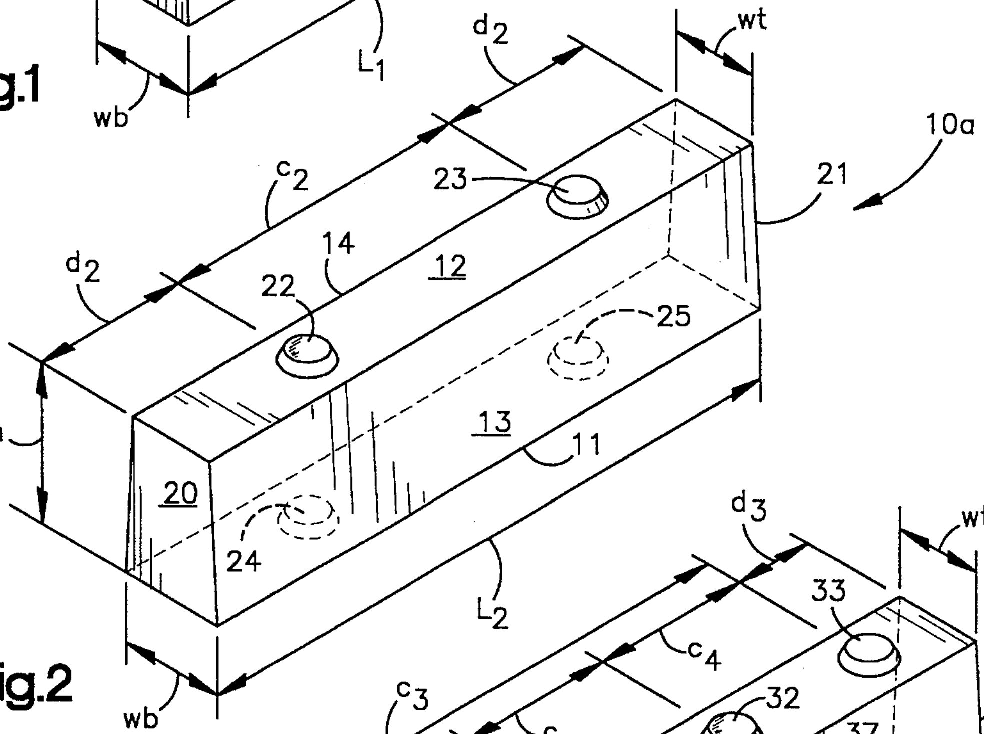
FIG. 2 is a perspective view of an another embodiment of a brick according to the present invention.

FIG. 2 illustrates a brick **10*a* that is similar in construction to the brick 10 illustrated in FIG. 1. The brick 10*a* has the same overall shape and features as the brick 10 illustrated in FIG. 1, but has a different overall length $L_2$. For illustrative purposes, the length $L_2$ of the brick 10*a* is 18 inches. The center to center distance between the mounting projections 22, 23 is still 9 inches, while the distance $d_2$ is equal to 4½ inches. Therefore, for brick 10*a*, the distance $c_2$ is twice the distance $d_2$. The other dimensions for the brick 10*a*, specifically wb, wt and h, are identical to the corresponding dimensions for the brick 10**.

Figure 3:
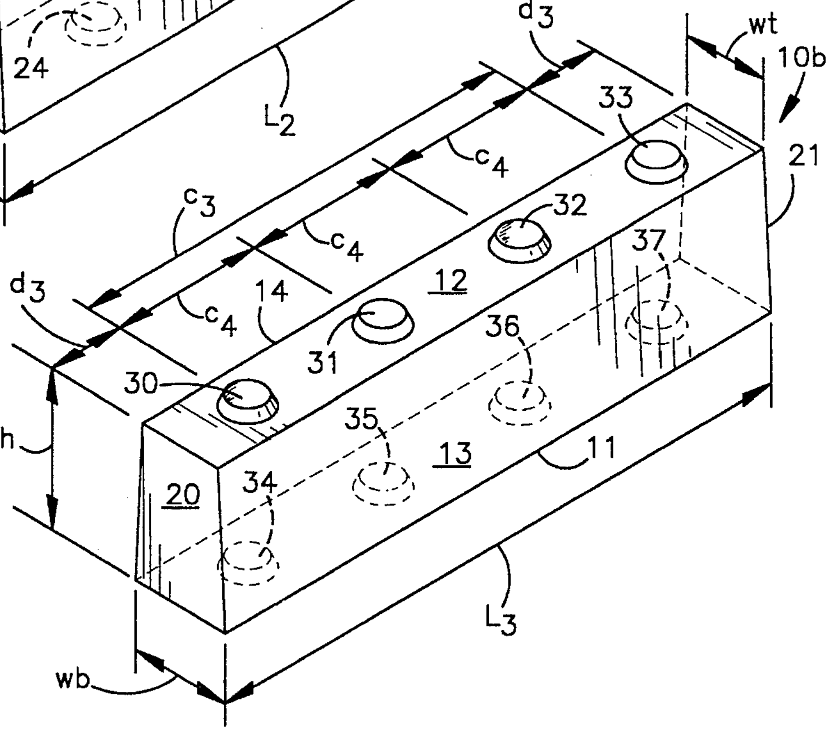
FIG. 3 is a perspective view of still another embodiment of a brick according to the present invention.

FIG. 3 illustrates a third brick **10*b*. The brick 10*b* has four mounting projections 30, 31, 32, 33. The brick 10*b* further includes four corresponding mounting recesses 34, 35, 36, 37. For illustrative purposes, the overall dimensions of the brick 10*b* are the same as the dimensions for the brick 10*a*. The center to center distance $c_4$ between two adjacent mounting projections is 4½ inches and the total center to center distance $c_3$ between the mounting projection 30 and the mounting projection 33 is 13½ inches. The distance $d_3$ from the center of either mounting projection 30 or 33** to its corresponding nearest end wall is 2¼ inches. Therefore, the total center to center distance $c_3$ is six times the distance $d_3$.

The dimensions of the bricks **10, 10*a*, 10*b*** are dictated by the user, the material with which they are made, and the mode of transportation used to transport the bricks to their point of use. For all three bricks, the distances c and d of the mounting projections are applicable to corresponding dimensions for the recesses of each brick.

Figure 4:
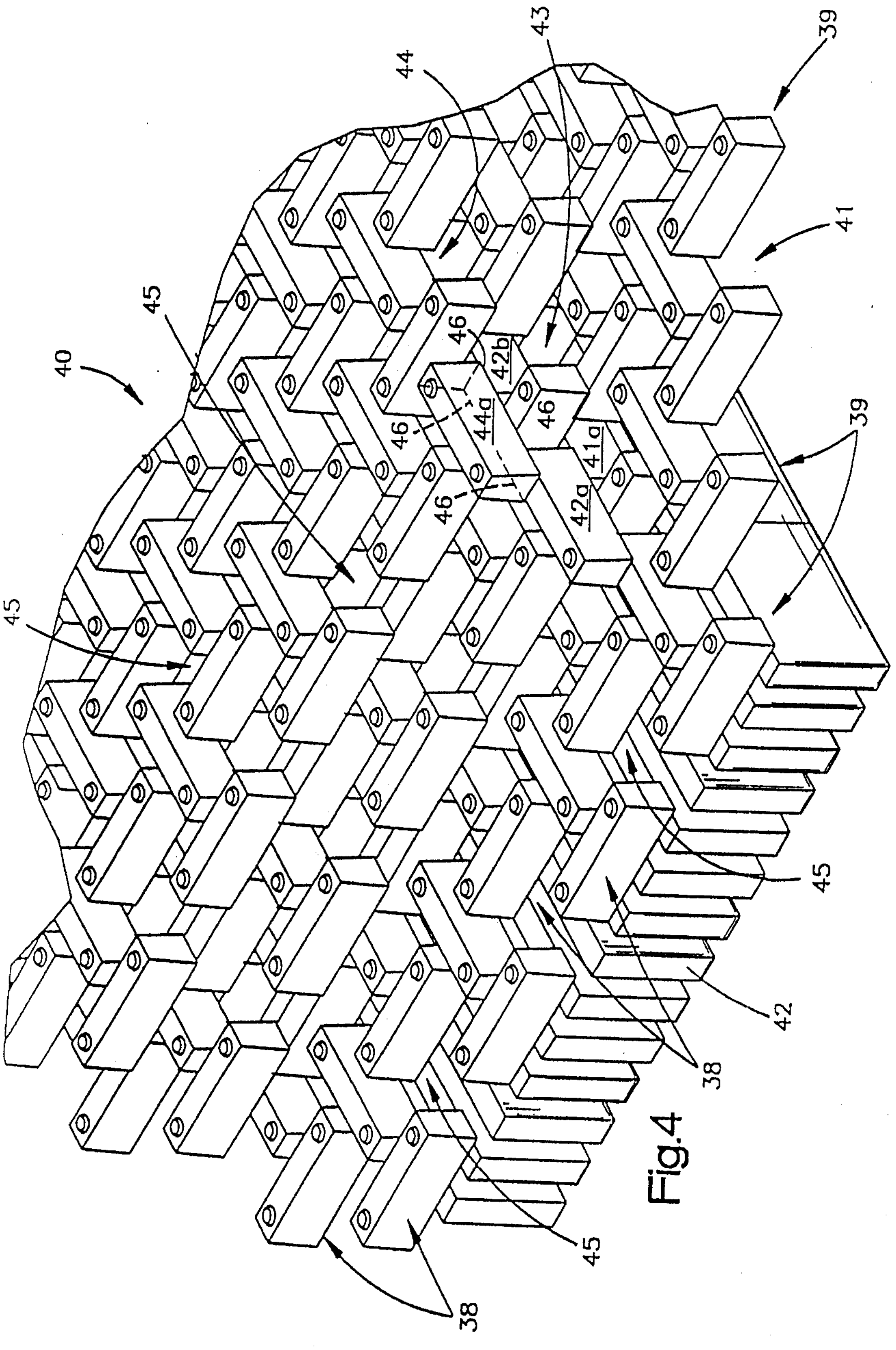
FIG. 4 is a fragmentary perspective view of a checkerwork utilizing checker bricks of FIG. 1.

FIG. 4 illustrates an embodiment of a checkerwork utilizing a plurality of bricks 10. The checkerwork 40 is made up of multiple tiers or layers of bricks 10 stacked in an interlocking relationship atop one another. A first tier 41 is placed on a grid 42. The bricks 10 of the first tier are spaced from each other such that no part of a brick is in contact with any other brick in that tier. Each brick is placed such that the brick is substantially perpendicular to and adjacent bricks. Therefore, a series of rows 38 of bricks is orthogonal to and positioned between bricks in alternating rows of a second series of rows 39 of bricks.

A second tier 43 is arranged similarly to the first tier 41. Each brick of the second tier 43 interlocks with two bricks of the first tier 41 that are located about a vertical plane that contains all three bricks. This interlocking is accomplished by mating the recesses of the bricks in the second tier with the mounting projections of the bricks in the first tier. The bricks of the second tier are also atop and orthogonal to a first tier brick that extends between the two mated first tier bricks.

Subsequent tiers are then created by repeatedly mounting bricks 10 in the same fashion. As can be seen in FIG. 4, a brick **44*a* in a third tier 44 is located directly above its corresponding brick 41a in the first tier 41. The positioning of each of the bricks 10 creates a plurality of flues 45** through which heated gases and air travel.

Additionally, each brick aligned and stacked on other bricks in contiguous tiers located below them has a portion of its base surface 11 exposed. This is due to the tapered shape of the bricks and, in the FIG. 4 embodiment, the spacing of the bricks of each tier. For example, brick 44a is aligned and interlocked with bricks 42a and 42b. Because the base 11 of brick 44a is wider than the tops 12 of bricks 42a and 42b, a portion 46 of the base 11 is exposed. In addition, small transverse portions of the base of brick 44a are exposed to the spaces between the ends of the bricks 42a and 42b and the orthogonal brick between their ends.

Figure 5:
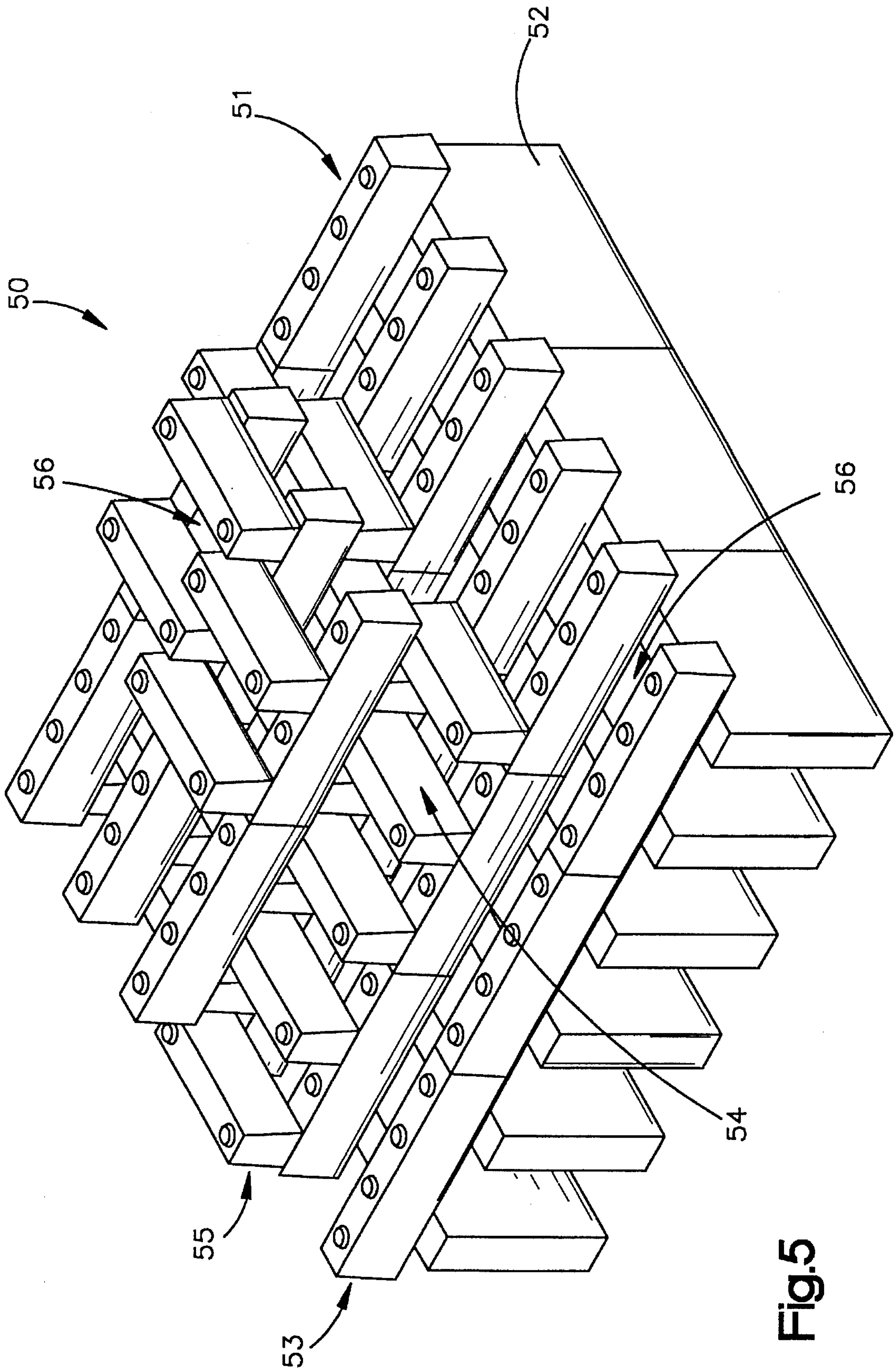
FIG. 5 is a fragmentary perspective view of another checkerwork utilizing checker bricks of FIGS. 1 and 3.

FIG. 5 illustrates a second checkerwork 50 that is comprised of alternating tiers of bricks wherein tiers of bricks 10b alternate with tiers of bricks 10. A first tier 51 is placed on a grid 52. The first tier 51 is comprised of parallel rows 53 of bricks 10b.

A second tier of bricks 54 is comprised of parallel rows 55 of bricks 10. The rows 55 are orthogonal to rows 53. Each brick 10 of the second tier 54 is mounted on and transverse to two bricks 10b of the first tier 51. Additionally, the bricks 10 of the second tier 54 are each spaced from all other bricks within the tier 54. Therefore, the bricks 10 of each row 55 within the second tier are staggered from each other. The checkerwork is completed by repeatedly forming alternating tiers in the described manner. The bricks within the checkerwork of FIG. 5 define flues 56 through which gases and air pass.

Figure 6:
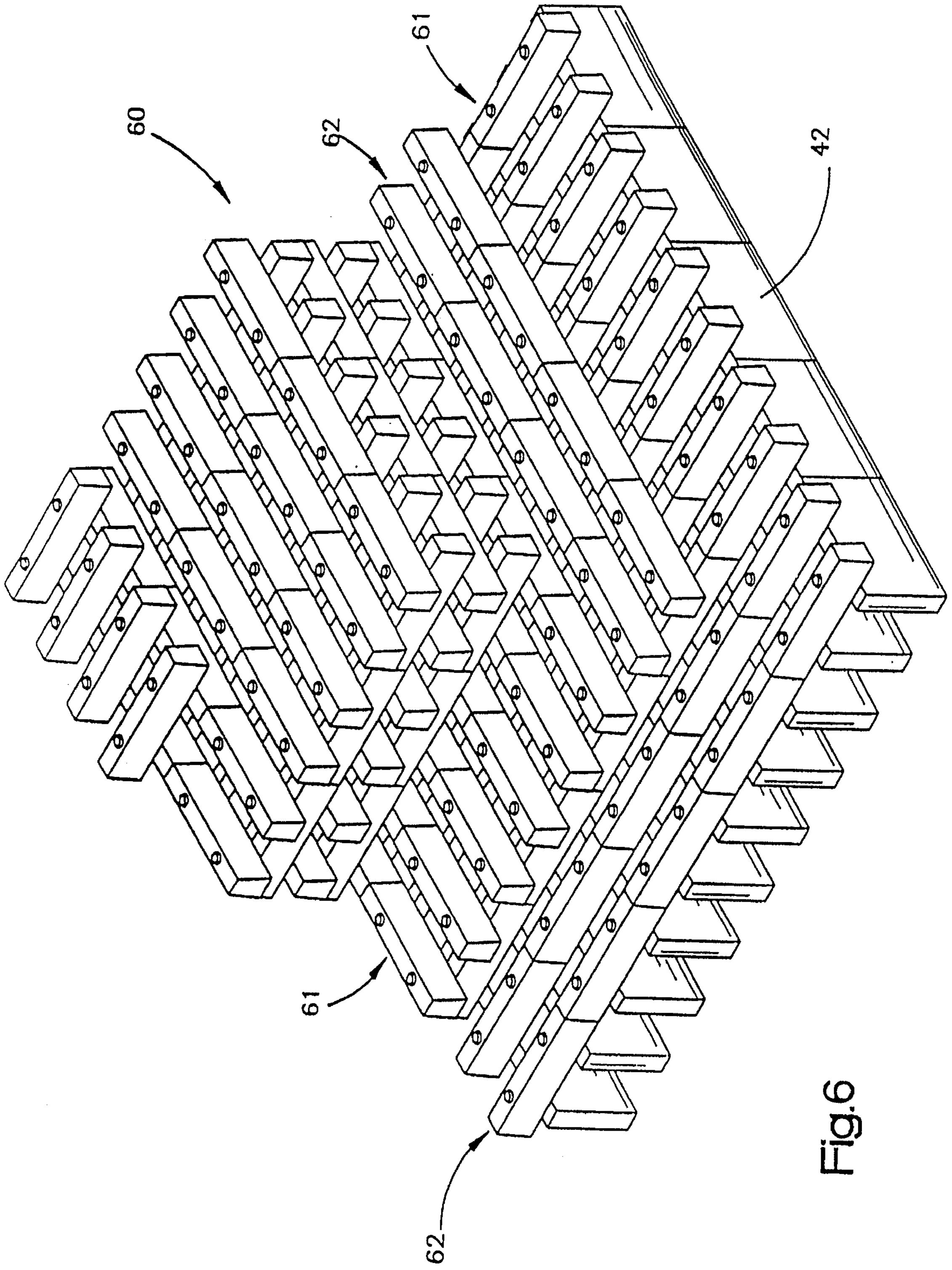
FIG. 6 is a fragmentary perspective view of still another checkerwork utilizing checker bricks of FIG. 2.

In a preferred embodiment, the checkerwork arrangement of FIG. 5 comprises approximately the upper fifteen percent of a total checkerwork while the remaining eighty-five percent of the total checkerwork is arranged as shown in FIG. 6.

FIG. 6 illustrates a checkerwork 60 comprised of tiers 61. The tiers 61 have rows 62 of bricks 10b. The bricks of each row are aligned end-to-end with each row 62 spaced from all others within its respective tier. Rows of each tier are transverse to rows of adjacent tiers.

Figures 7A, 7B, 7C, 7D, 7E:
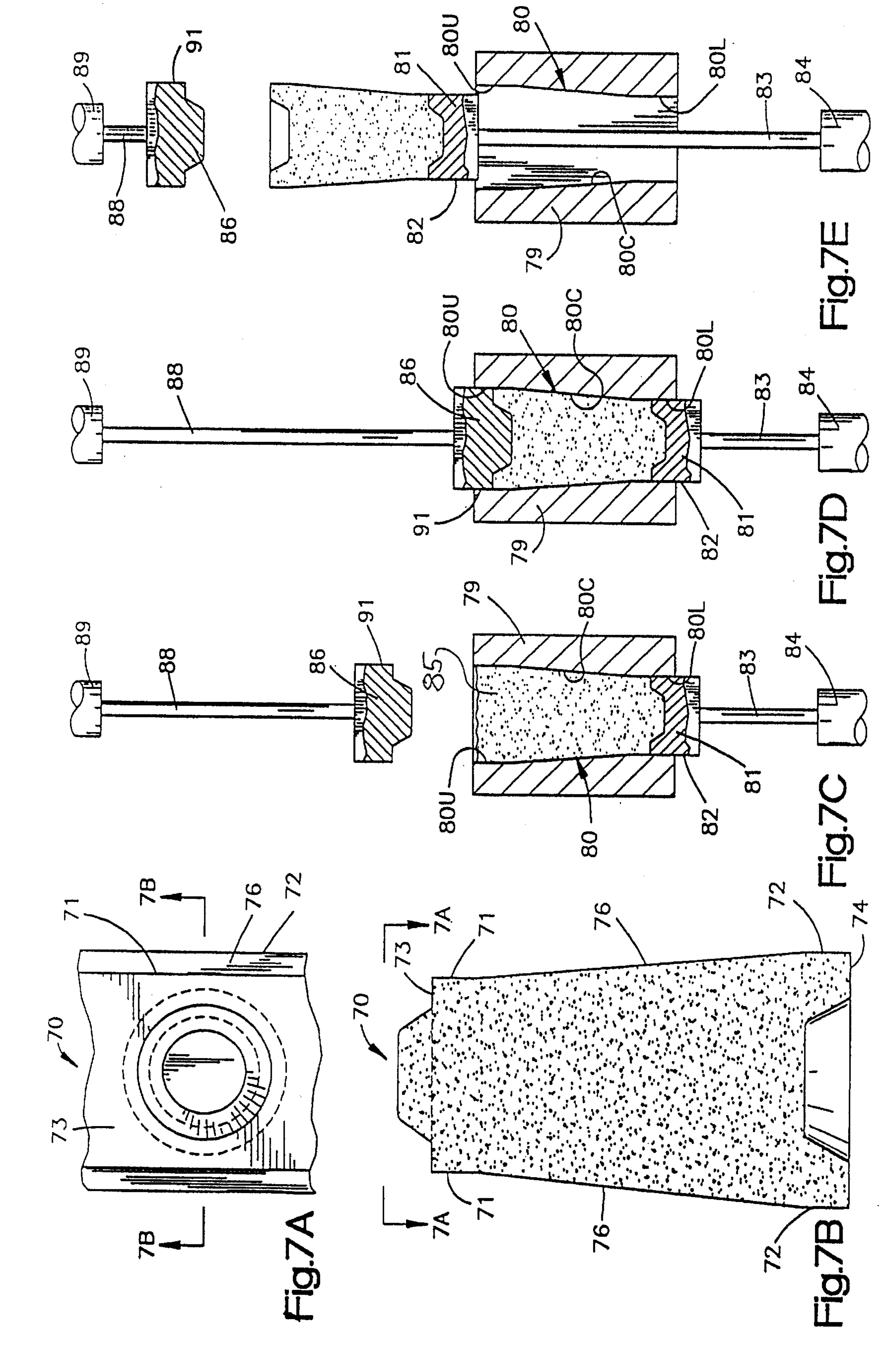
FIG. 7A is a fragmentary top plan view of the preferred brick as seen from the plane indicated by the line 7A—7A of FIG. 7B.
FIG. 7B is a sectional view of the preferred brick as seen from the plane indicated by the line 7B—7B of FIG. 7A; and, FIGS. 7C–7E are sequential diagrammatic views illustrating the compaction of a mass of brick raw material to form it into the configuration of the finished brick prior to its firing.

Referring now to FIGS. 7A–7E, the now preferred cross-sectional brick configuration of any of the bricks 10, 10a, 10b is shown together with a schematic showing of the method of and apparatus for forming the preferred brick. Referring to FIGS. 7A–7B, the preferred brick is identified by the reference numeral 70. The side walls each include an upper and a lower planar section 71, 72 which are respectively adjacent to and perpendicular to top and bottom surfaces 73, 74 of the brick. The upper and lower sections 71, 72 are respectively spaced and parallel with the lower sections spaced a greater distance than the upper. In the drawings, the spacing of the lower sections has been exaggerated somewhat to make the configuration of the brick visually more apparent. The sides of the brick 70 include central sections 76 which respectively taper outwardly and downwardly from the upper sections 71 to the lower sections 72 such that the overall configuration of the brick in cross section is substantially, but not completely, trapezoidal in shape.

The purpose of the upper and lower sections 71, 72 is best understood by reference to FIGS. 7C–7E. There, a mold is shown in cross section at 79. The mold 79 has internal walls 80 which delineate the sides of a mold cavity. The walls 80 have upper, central and lower sections 80U, 80C, 80L which respectively shape the sections 72, 76, 71 of the sides of a brick 70.

In FIGS. 7C–7D, a lower mold section 81 is shown partly inserted into the cavity delineated by the walls 80. The lower wall section has side surfaces 82 which are complemental to, and in a close sliding fit with, the lower wall sections 80L. The lower mold section 81 is supported by a ram 83. The ram 83 may be the piston rod of a prime mover in the form of a fluid cylinder 84.

In making a brick, the lower mold section is elevated along a path. The path parallels lines of cross section of the lower wall sections so that elevation can continue until it is at or slightly within a lower entrance to the cavity defined by the walls 80 and the surfaces 82 and lower wall sections 80L assume a close sliding relationship. A quantity of brickmaking raw material 85 is then deposited in the cavity as indicated in FIG. 7C.

An upper mold section 86 is carried by an upper ram 88. Like the ram 83, the ram 88 may be the piston rod of a prime mover in the form of a fluid cylinder 89. After an appropriate quantity of the brick raw material 85 has been placed in the mold cavity, the prime mover 89 drives the upper mold section 86 along a path aligned with the lower path to bring the upper mold section to or into the upper entrance to the mold cavity. The upper path, like the lower, parallels lines of cross section of the upper wall sections 80U to enable side surfaces 91 of the upper section 86 to assume close, sliding complemental fits with the upper wall sections 80U.

Continued operation of either or both of the prime movers 84, 89, but preferably only the upper prime mover 89, compresses the material 85 until a desired density has been reached and the raw material 85 has assumed the shape of a brick as shown in FIGS. 7D–7E. Compression with the larger mold section while the smaller is stationary is preferred because it minimizes height variations due to variations in the material density. Further, the larger section is preferably the upper section to minimize shearing.

Since the upper and lower brick sections 71, 72 are perpendicular to the top and bottom 73, 74 of the brick, it is possible to compress the brick until a desired density is achieved. This is because both wall sections allow a range of movement of the upper and lower mold sections 86, 81 while maintaining close sliding fits between the mold section side surfaces 82, 91 and the upper and lower wall sections 80U, 80L. Thus, while the finished bricks may vary one from another in height by a slight amount, the densities of the bricks will be uniform, producing the advantages that have been described. By contrast, if the walls 80 are truly trapezoidal, the upper die section 86 cannot be forced into the cavity and if the lower die section 81 is forced into the cavity, the raw material 85 will be forced between the side surfaces 82 of the lower mold section 81 and the mold walls 80 producing an undesirable flange on the brick. As a consequence, where the bricks are truly trapezoidal in cross section, one of necessity produces bricks of uniform height, but not uniform density because of variations in the raw material.

After the material 85 has been compressed as indicated schematically in FIG. 7D, the compacted material, now in the shape of the finished brick, is stripped from the mold as shown in FIG. 7D, and thereafter it is fired to complete the brick formation operation.

The shape of the bricks and the spacing between the bricks provides more exposed brick area than prior bricks and checkerworks and thereby provides a more efficient heat transfer. In the checkerwork illustrated in FIG. 4, at least portions of all six surfaces of the bricks 10 are exposed. In the checkerwork illustrated in FIG. 5, in the tiers 54, at least a portion of all six surfaces of the bricks 10 is exposed. In the checkerworks illustrated in FIGS. 5 and 6, in the tiers 51 and 61, respectively, at least portions of four surfaces of the bricks 10*a* and 10*b* respectively, are exposed.

The arrangement of the bricks provides for more turbulence and a reduced laminar flow within the gas flow and the air flow. These advantages are provided for in large part by the trapezoidal shape of the bricks.

Because of the tapered design of the bricks, all embodiments of the checkerworks have overhanging lips that increase turbulence within the flues. Air or gas flowing along a brick in one tier will encounter the base of a brick in the same vertical plane, but different tier.

Although the preferred embodiment of this invention has been shown and described, it should be understood that various modifications and rearrangements of the bricks and checkerworks may be made without departing from the scope of the invention as disclosed and claimed herein.

I claim:

1. A checker brick mold comprising:

a. a mold body having walls defining an internal cavity having spaced cavity entrances;

b. a pair of side ones of the walls being laterally spaced and each including longitudinally spaced and parallel cavity entrance portions respectively adjacent said entrances;

c. the entrance portions at one entrance being transversely spaced less than the entrance portions at the other entrance;

d. the side walls also each including a central portion between and adjacent its entrance portions and flaring outwardly from said one entrance portion to said other entrance portion;

e. a spaced pair of mold entrance sections each adapted to be inserted into an associated one of the entrances and having surfaces complemental to the entrance portions of its associated entrance; and f. prime mover means operatively connected to the entrance sections for moving the sections toward one another to compress a mass in the cavity and away from one another to remove a compressed mass from the cavity.

2. The mold of claim 1 wherein the prime mover means forces both of the sections into the cavity when a mass is being compressed.

3. The mold of claim 1 wherein said other entrance is a top entrance.

4. The mold of claim 1 wherein the prime mover forces the section complemental to said other entrance portion into the cavity while the section complemental to said one entrance portion is maintained substantially stationary as the mass is being compressed.

* * * * *